United States Patent
Reimann et al.

(10) Patent No.: US 7,066,049 B2
(45) Date of Patent: Jun. 27, 2006

(54) WEAR-FREE ACCELERATOR PEDAL KICK-DOWN SWITCH

(75) Inventors: Christian Reimann, Wehrheim (DE); Christian Weis, Mainz (DE); Joachim von Willich, Selters (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/787,745

(22) Filed: Feb. 27, 2004

(65) Prior Publication Data

US 2004/0163488 A1 Aug. 26, 2004

Related U.S. Application Data

(63) Continuation of application No. PCT/DE02/03240, filed on Aug. 30, 2002.

(30) Foreign Application Priority Data

Aug. 31, 2001 (DE) ................. 101 42 451
Apr. 17, 2002 (DE) ................. 102 17 050

(51) Int. Cl.
*G01G 1/14* (2006.01)
(52) U.S. Cl. ............... 74/513; 74/514; 73/132
(58) Field of Classification Search ............. 74/512, 74/513, 514; 73/1.79, 118.1, 132
See application file for complete search history.

(56) References Cited

U.S. PATENT DOCUMENTS

| | | | |
|---|---|---|---|
| 5,506,502 A | | 4/1996 | Maennle |
| 5,855,146 A | * | 1/1999 | Papenhagen et al. ......... 74/560 |
| 6,276,229 B1 | | 8/2001 | Goehring et al. |
| 6,446,500 B1 | * | 9/2002 | Marquardt et al. ........... 73/132 |
| 6,533,705 B1 | * | 3/2003 | Giefer et al. ................. 477/96 |
| 6,689,016 B1 | * | 2/2004 | Apel ........................... 74/513 |

FOREIGN PATENT DOCUMENTS

DE 195 03 335 A1 12/1995

OTHER PUBLICATIONS

Derwent Abstract DE19503335A1; Dec. 21, 1995; AB Elektronik GmbH; D-59368 Werne.
Derwent Abstract FR2730052A; Dec. 21, 1995; Siemens Automotive SA; FR-Toulouse-Cedex.

* cited by examiner

*Primary Examiner*—Chong H. Kim
(74) *Attorney, Agent, or Firm*—Siemens AG

(57) ABSTRACT

The present invention relates to an accelerator pedal for a motor vehicle, especially one with an automatic gearbox. The pedal includes a pedal arm which in one end area thereof is pivotally mounted about a pivoting axis and which in the other end thereof is provided with a pedal plate which can be impinged upon the force by the driver. When force is exerted upon the pedal plate, the pedal arm can be pivoted into an absolute final position when a kick down switch is actuated, wherein a signal can be produced by the kick down switch and can be fed to a control electronics system. The kick down switch comprises a permanent magnet, the magnet force thereof being used to retain a magnetically conducting component on a magnetic return element whereby the component can be moved away from the magnetic return element as a result of the movement of the pedal arm into an end position.

25 Claims, 3 Drawing Sheets

US 7,066,049 B2

WEAR-FREE ACCELERATOR PEDAL KICK-DOWN SWITCH

CROSS REFERENCE TO RELATED APPLICATIONS

The present application is a continuation of international application PCT/DE02/03240, filed Aug. 30, 2002, and further claims priority to German patent applications DE10142451.5 and DE10217050.9, filed Aug. 31, 2001 and Apr. 17, 2002 respectively, all of which are herein incorporated by reference.

BACKGROUND OF THE INVENTION

The invention relates to an accelerator pedal for a motor vehicle. The motor vehicle may in particular having an automatic transmission. The pedal includes a pedal arm which is mounted so as to be pivotable about a pivot axis in its one end region and has, in its other end region, a pedal plate to which force can be applied by the driver of the motor vehicle, the pedal arm being capable of pivoting out of a position of rest counter to a spring force into a full throttle position through the application of force of the pedal plate, and when an additional force threshold of a kick-down switch is overcome by activating the kick-down switch it can be pivoted on into an absolute end position in which a signal can be generated by the kick-down switch and can be fed to control electronics.

With such an accelerator pedal it is known that the pedal arm comes into abutment against a tappet of the kick-down switch when the full throttle position is reached, and correspondingly axially displaces the tappet into the absolute end position during the further movement. A plurality of latching recesses, into which radially guided latching balls project with part of their circumference are formed on the radially circumferential outer face of the tappet, said latching balls being loaded into the latching recesses by springs and being moved out of the latching recesses by the further movement of the pedal arm and in the process overcoming the force threshold with which the latching balls are loaded into the latching recesses. A signal is then triggered in the absolute end position as a result of two electrical contacts being bridged.

This embodiment is not only costly in terms of components but also leads with time to wear on the latching balls and latching recesses, as a result of which in turn the force threshold to be overcome changes during the activation of the kick-down switch.

SUMMARY OF THE INVENTION

An object of the invention is to provide an accelerator pedal of the type mentioned at the beginning that has a wear-free kick-down switch which is of simple design and has a largely constant force threshold.

This and other objects are achieved according to the invention in that the kick-down switch has a magnet through whose magnetic force a magnetically permeable component can be held in abutment against a return element and can be loaded so as to be moved away from the return element by the movement of the pedal arm into the absolute end position.

The magnetically permeable component is held by the magnet against the return element with a specific force which forms the force threshold when the kick-down switch is not activated. In order to overcome this force threshold, the pedal arm must be loaded by the driver of the motor vehicle with a correspondingly increased force so that the magnetically permeable component is released from the return element, and the pedal arm can pivot back into its absolute end position. As the holding force drops immediately sharply after the magnetically permeable component has been released by the return element, and decreases quickly even more during the further movement of the magnetically permeable component away from the return element, essentially only one force threshold has to be overcome, and no further opposing force during the further movement into the absolute end position.

As the force threshold is not generated mechanically but rather by the magnetic force of the magnet, no wear occurs at the components generating the force threshold, and the force threshold is not reduced over the service life of the accelerator pedal.

In a motor vehicle with automatic transmission, the control electronics can trigger, for example, shifting down into a lower gear speed by means of the signal of the kick-down switch in order to be able to accelerate strongly.

However, other functions which can be triggered by the signal of the kick-down switch are also conceivable.

If, for example, the motor vehicle has a speed limiter, the control electronics can clear a previously set limiting speed again by means of the signal of the kick-down switch. This application is independent of whether the motor vehicle has an automatic transmission or a manual shift transmission.

In order to be able to ensure that the magnetically permeable component is reliably guided back to abutment against the return element after the pedal arm has been guided back into a position underneath the full throttle position, the magnetically permeable component can be loaded against the return element by a spring force. However, only a small spring force is necessary to do this. The magnetically permeable component can be loaded against the return element by a permanently supported, prestressed compression spring which is preferably a helical spring or may also be an elastomer block.

In order to transmit the movement of the pedal arm to the magnetically permeable component, a tappet can have an end face which is loaded so as to be axially displaceable by the movement of the pedal arm, and the end of the tappet which is opposite the end face loads the magnetically permeable component so as to move it away from the return element.

If the tappet is constricted so as to be magnetically permeable, it serves simultaneously for concentrating the magnetic field lines and guiding the magnetic flux to the magnetically permeable component. In this way the overall size of the magnet can be kept small.

It serves to reduce the overall space and further concentrate the magnetic flux if the magnet is a ring magnet through whose central opening the tappet is guided and from whose end facing away from the end face the magnetically permeable component which is embodied as a circular plate can be loaded.

If the tappet and magnetically permeable component are embodied in one piece, the magnetic flux is improved even further.

The magnetically permeable component can however also be attached to the tappet.

In order to hold the magnetically permeable component in a specific orientation with respect to the return element after said component has lifted off from the return element, the magnetically permeable component can have a guide pin which is guided in an axially displaceable fashion in a guide bore.

So that the holding force acts in a way which is distributed uniformly over the circumference of the ring magnet, the return element may be embodied so as to be annular and may surround the ring magnet.

In order to concentrate the magnetic flux further, the annular return element has a ring slider part which, at the region of the tappet which is near to the end face, extends radially as far as the tappet, and the tappet is guided through its central ring bore.

When the kick-down switch is not activated, the magnetically permeable component is preferably in abutment against the end of the return element which is remote from the pedal arm.

If the magnetically permeable component and the return element here are each electrically conductively connected to a contact of an electrical switch, the magnetically permeable component and return element form contact elements of the kick-down switch which can be connected to one another simultaneously in a double function and which generate, when they are separated from one another, a signal which can be fed to the control electronics.

Another possible way of forming the switch is a Hall element which is arranged between the return element and a radial collar part of the tappet and when the collar part is moved toward or away from the return element the magnetic field which influences the Hall element changes a signal in the Hall element with a triggering effect. The triggering of the signal takes place here in a contactless, and thus wear-free fashion.

The kick-down switch can either be arranged on the pedal arm, and the magnetically permeable component can be loaded by the pedal arm in the full throttle position against a fixed stop or be fixedly arranged, and in the full throttle position the magnetically permeable component can be loaded by the pedal arm.

The magnet may be a permanent magnet so that the generated force threshold to be overcome always remains the same. Its arrangement is simple as there is no need for a voltage supply to operate it.

The magnet can however also be an electromagnet.

If the electromagnet can be loaded here with a coil current of variable size, the force level of the force threshold to be overcome can thus also be correspondingly varied.

The coil current can be adjustable here in a variable fashion as a function of the control state of the automatic transmission such as, for example, the respectively selected gear speed.

A different possibility is for the coil current to be adjustable in a variable fashion as a function of the driving state, for example the respective travel speed of the motor vehicle.

The respective level of the force threshold to be overcome provides the driver of the motor vehicle with haptic feedback on the instantaneous control state of the automatic transmission or on the instantaneous travel speed.

BRIEF DESCRIPTION OF THE SEVERAL VIEWS OF THE DRAWINGS

Exemplary embodiments of the invention are illustrated in the drawing and will be described below in more detail. In the drawings.

DETAILED DESCRIPTION OF THE INVENTION

Figure 1:
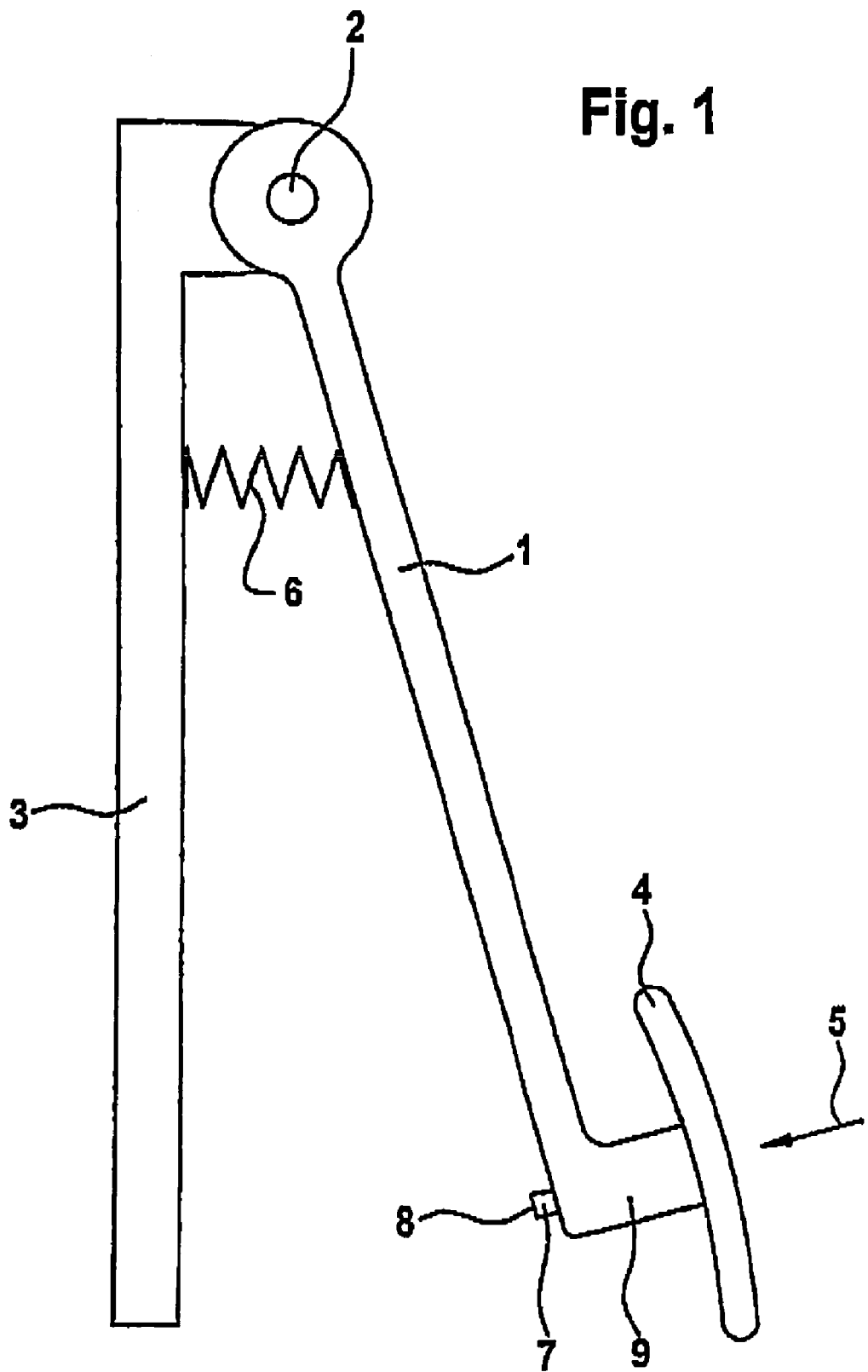
FIG. 1 depicts a side view of an accelerator pedal.

The accelerator pedal illustrated in FIG. 1 for a motor vehicle has a pedal arm 1 which is mounted so as to be pivotable about a pivot axis 2 with one of its ends on a fixed baseplate 3. At its other end, the pedal arm 1 has a pedal plate 4 which can be loaded with force by a driver in the direction of the arrow 5 counter to the force of a restoring spring 6. When the pedal plate 4 is not loaded by the driver, the pedal arm 1 is moved into the illustrated position of rest by the restoring spring 6.

If the driver loads the pedal plate 4, depending on the application of force the pedal arm 1 is pivoted into its full throttle position in which it moves into abutment against the baseplate 3 with an axially displaceable tappet 7 of a kick-down switch which protrudes on the side of the pedal arm 1 which is remote from the pedal plate 4. When the pedal arm 1 moves further as far as its absolute end position in which it moves itself into abutment against the baseplate 3, the tappet 7 is displaced axially into its receptacle in the pedal arm 1, by overcoming an additional force threshold, and the kick-down switch is activated.

Figure 2:
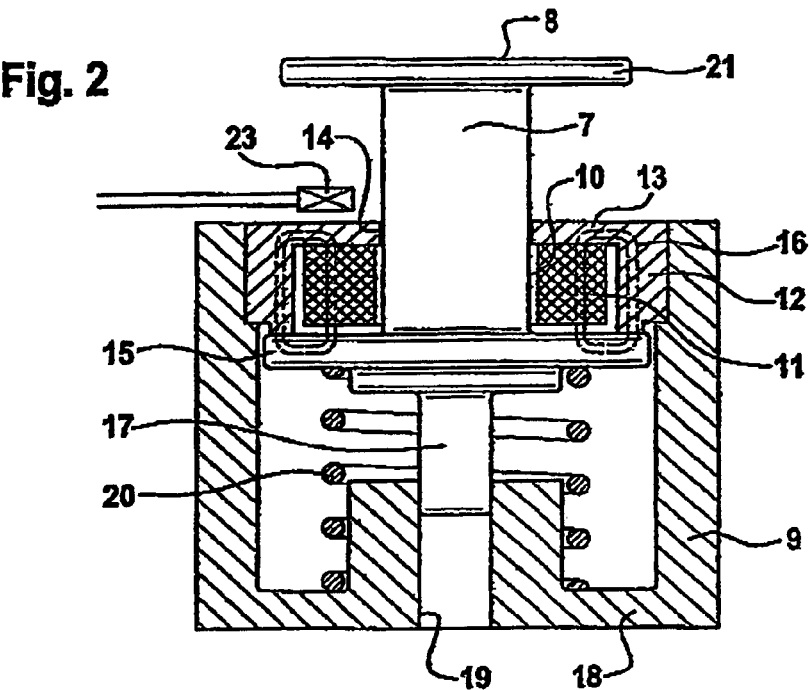
FIG. 2 depicts a first exemplary embodiment of an un-activated kick-down switch of the accelerator pedal according to FIG. 1 in cross section.
Figure 3:
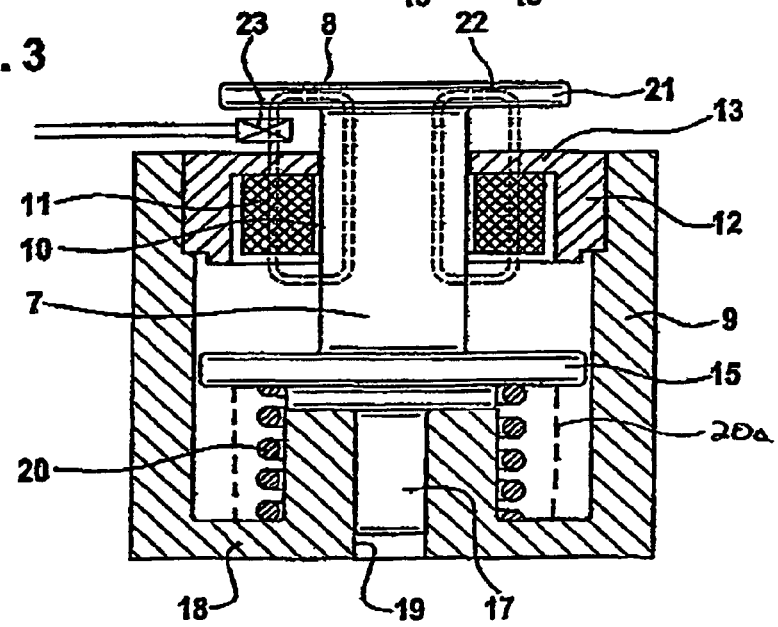
FIG. 3 depicts the activated kick-down switch according to FIG. 2 in cross section.
Figure 4:
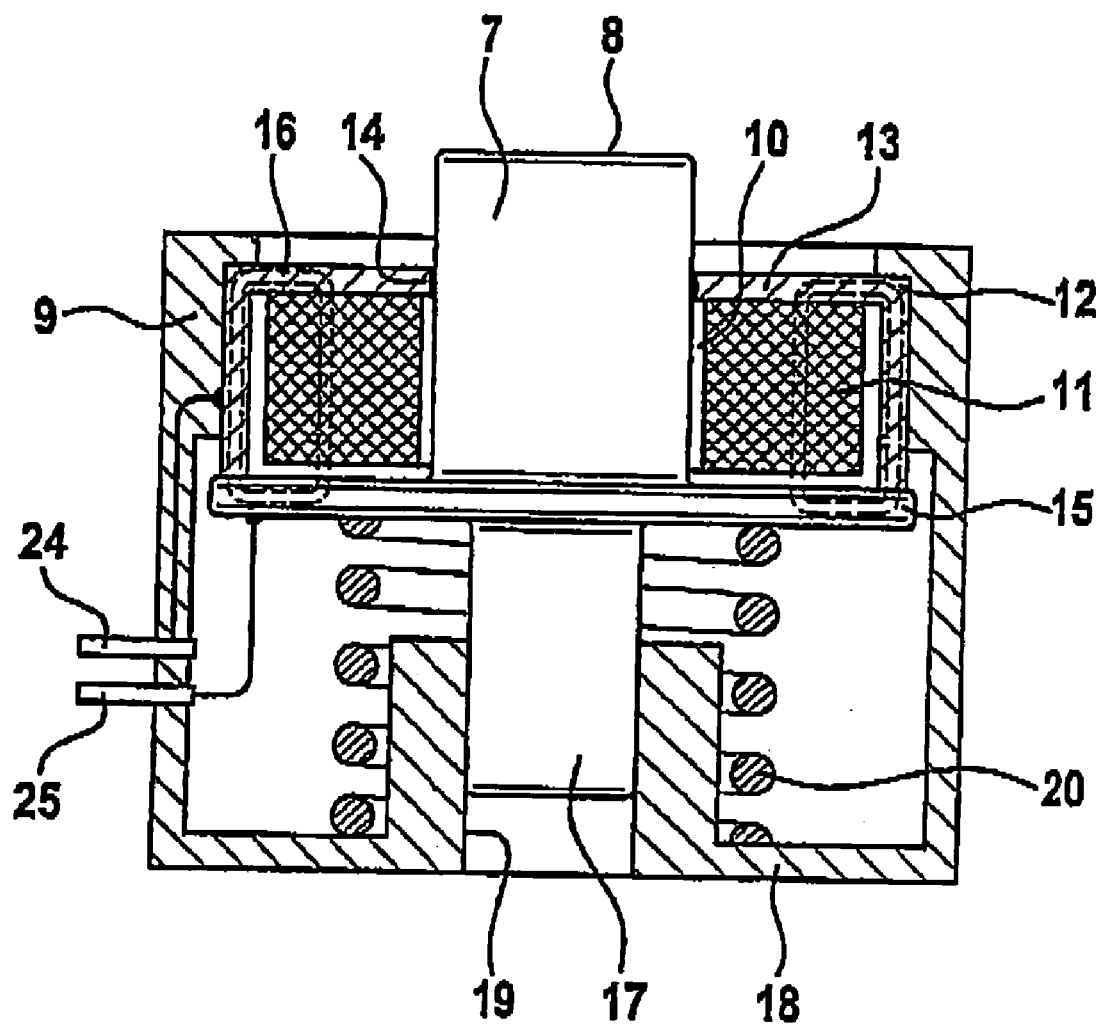
FIG. 4 depicts a second exemplary embodiment of an un-activated kick-down switch of the accelerator pedal according to FIG. 1 in cross section.

Two exemplary embodiments of the kick-down switch arranged in the receptacle of the pedal arm 1 are illustrated in FIGS. 2 to 4.

They show the axially displaceable tappet 7 which projects with the end of its end face 8 which can be moved into abutment against the baseplate 3, from a pot-shaped housing 9 made of magnetically nonpermeable material of the kick-down switch.

At its other end region, the tappet 7 which is embodied so as to be magnetically permeable is guided through a central opening 10 of an axially magnetized permanent magnet which is embodied as a ring magnet 11 and is surrounded by an annular return element 12 which has a ring slider part 13 which extends radially on the outside as far as the tappet 7 and through whose central ring bore 14 the end of the tappet 7 which projects out of the housing 9 is guided.

In the illustrated exemplary embodiment, the ring magnet is a permanent magnet. However, instead of the permanent magnet, an electromagnet could also be used, the holding force of which magnet depends on the coil current which loads the magnetic coil of the electromagnet.

At the annular end of the return element 12 which projects into the interior of the housing, a magnetically permeable component which is embodied as a circular plate 15 is held, in the position of rest illustrated in FIGS. 2 and 4, by the force of the ring magnet 11.

In this position of rest, the axial magnetic flux of the ring magnet 11 is closed by means of the magnetically permeable circular plate 15 and the return element 12, as illustrated by the magnetic field lines 16 in FIGS. 2 and 4.

On the side opposite the tappet 7, the circular plate 15 has, coaxially with respect to said tappet 7, a guide pin 17 which projects into a guide bore 19 which is formed on the bottom 18 of the housing 9 and is guided so as to be axially displaceable therein.

The circular plate 15 is loaded against the return element 12 by a helical spring 20 of low force which is supported on the bottom 18 of the housing 9. In place of the helical spring, an elastomer block 20a (depicted by dashed lines in FIG. 3) may be used.

If, as illustrated in FIG. 3, the end face 8 of the tappet 7 has force applied to it by abutment against the baseplate 3, and if there is a significant increase in the application of force by the driver, the holding force with which the ring magnet holds the circular plate 15 against the return element and which forms a force threshold is overcome and the tappet 7 is displaced into the interior of the housing 9.

In the process, the magnetic flux through the circular plate 15 to the return element 12 is interrupted. The magnetic flux then passes via the magnetically permeable tappet 7. Whereas in the exemplary embodiment in FIG. 4 this magnetic flux passes via the tappet 7 and the ring slider part 13 of the return element 12, in the exemplary embodiment in FIGS. 2 and 3 the magnetic flux in the tappet 7 is directed as far as its outwardly projecting end and via a radial collar part 21 of the tappet at this end to the outwardly directed pole of the ring magnet 11, as is shown by the magnetic field lines 22 illustrated in FIG. 3.

When an electromagnet is used, the coil current which is applied to its magnetic coil could be adjusted, by a control unit, to a different value which is dependent on which gear speed of the automatic transmission is engaged at a particular time, or the travel speed at which the motor vehicle is traveling at a particular time. Corresponding signals are received by the control unit from a transmission sensor or a travel speed sensor.

A Hall element 23, which is largely uninfluenced by the magnetic field of the ring magnet 11 in the position of rest of the kick-down switch (FIG. 2), is arranged axially between the collar part 21 and the pole facing it, of the ring magnet 11. However, in the activation position (illustrated in FIG. 3) of the kick-down switch, the magnetic field lines 22 of the magnetic flux cross the Hall element 23 and trigger a kick-down signal in it, which signal is fed to control electronics (not illustrated) of the motor vehicle.

In the exemplary embodiment in FIG. 4, a first electrical contact 24 is electrically conductively connected to the return element 12, and a second electrical contact 25 is electrically conductively connected to the circular plate 15. In the illustrated position of rest, the contacts 24 and 25 are electrically conductively connected to one another via the return element 12 and the circular plate 15. When the tappet 7 and the circular plate 15 are displaced, this circuit is disconnected, and a kick-down signal which is fed to control electronics (not illustrated) of the motor vehicle is thus triggered.

We claim:

1. An accelerator pedal for use in a motor vehicle, said pedal comprising:
    a base plate,
    a pedal arm having a first and second end, said first end being pivotably mounted to said base plate on a pivot axis, said second end comprising a pedal plate to which a vehicle driver force can be applied;
    a spring mounted between said pedal arm and base plate, said spring providing resistance to depression of said pedal arm towards said base plate such that said pedal arm defines a rest position away from said base plate and an end position proximate to said base plate;
    a kick down switch mounted proximate to said second end so as to extend away from said second end towards said base plate, said kick down switch comprising a force threshold and signal generating means arranged within said kick down switch such that when said force threshold is manually overcome, said signal generating means is activated thereby generating a signal, and said kick down switch further comprises a magnet, magnetically permeable component and a return element arranged such that a magnetic field generated by said magnet generates a holding force which holds said component to said return element and generates a counter force to said driver force, said holding force being overcome by movement of said pedal arm into said end position; and
    a Hall element arranged between said return element and a radial collar part of a tappet, such that when said collar part is moved toward or away from said return element, said magnetic field influences said Hall element so as to change a signal in said Hall element thereby having a triggering effect.

2. The pedal according to claim 1, wherein said motor vehicle comprises an automatic transmission.

3. The pedal according to claim 1, wherein said magnetically permeable component is loaded against the return element via a spring force.

4. The pedal according to claim 3, wherein said magnetically permeable component is loaded against said return element by a permanently supported, prestressed compression spring.

5. The pedal according to claim 4, wherein said compression spring is a helical spring.

6. The pedal according to claim 4, characterized in that said compression spring is an elastomer block.

7. The pedal according to claim 1, further comprising said tappet having an end face which can be loaded so as to be axially displaceable by movement of said pedal arm, and the end of said tappet which is opposite to said end face comprises means for pressuring said magnetically permeable component so as to move the end of said tappet away from said return element.

8. The pedal as claimed in claim 7, wherein said tappet is magnetically permeable.

9. The pedal according to claim 7, wherein said magnet is a ring magnet having a central opening through which said tappet is guided such that said end of said tappet which is opposite said end face pressures said magnetically permeable component.

10. The pedal according to claim 7, wherein said magnetically permeable component is a circular plate.

11. The pedal according to claim 7, wherein said tappet and magnetically permeable component are embodied in one piece.

12. The pedal according to claim 1, wherein said magnetically permeable component is attached to said tappet.

13. The pedal according to claim 12, wherein said magnetically permeable component comprises a guide pin which is guided in an axially displaceable fashion in a guide bore.

14. The pedal according to claim 9, wherein said magnetically permeable component comprises a guide pin which is guided in an axially displaceable fashion in a guide bore.

15. The pedal according to claim 9, wherein said return element comprises an annular body surrounding said ring magnet.

16. The pedal according to claim 15, wherein said annular return element comprises a ring slider part which, at a region of said tappet near to said end face, extends radially as far as said tappet, and said tappet is guided through said a central ring bore of said return element.

17. The pedal according to claim 1, wherein when said kick down switch is not activated, said magnetically permeable component abuts against an end of said return element which is remote from said pedal arm.

18. The pedal according to claim 1, wherein said kickdown switch is arranged on said pedal arm, and said magnetically permeable component may be pressured by said pedal arm when said arm is in a full throttle position against a fixed stop.

19. The pedal according to claim 1, wherein said when kick down switch is fixedly arranged and in a full throttle position, said magnetically permeable component may be pressured by said pedal arm.

20. The pedal according to claim 1, wherein said magnet is a permanent magnet.

21. The pedal according to claim 1, wherein said magnet is an electromagnet.

22. The pedal according to claim 21, wherein said electromagnet may be pressured by a variably sized coil current.

23. The pedal according to claim 22, wherein said coil current may be adjusted in a variable fashion as a function of a control state of an automatic transmission of said vehicle.

24. The pedal according to claim 22, wherein said coil current is variably adjustable as a function of a driving state of said motor vehicle.

25. The pedal according to claim 24, wherein said coil current may be adjusted as a function of travel speed of said motor vehicle.

* * * * *